United States Patent
Malm et al.

(10) Patent No.: US 12,013,684 B2
(45) Date of Patent: Jun. 18, 2024

(54) COMMISSIONING DEVICES TO PROCESS AUTOMATION SYSTEMS USING PORTABLE SETUP DEVICES

(71) Applicant: Yokogawa Electric Corporation, Tokyo (JP)

(72) Inventors: Joseph Malm, Plano, TX (US); David Emerson, Coppell, TX (US); Andrew Keller, Lewisville, TX (US); Patrick Clay, Frisco, TX (US); Hidenori Sawahara, Spring, TX (US); Vien Nguyen, Frisco, TX (US)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 630 days.

(21) Appl. No.: 17/211,470

(22) Filed: Mar. 24, 2021

(65) Prior Publication Data

US 2022/0308555 A1    Sep. 29, 2022

(51) Int. Cl.
*G05B 19/4155* (2006.01)
*G06K 7/14* (2006.01)
*H04W 76/10* (2018.01)

(52) U.S. Cl.
CPC ....... *G05B 19/4155* (2013.01); *G06K 7/1413* (2013.01); *G06K 7/1417* (2013.01); *H04W 76/10* (2018.02); *G05B 2219/31368* (2013.01)

(58) Field of Classification Search
CPC ...... G05B 19/4155; G05B 2219/31368; G05B 19/4185; G05B 19/41845; G06K 7/1413;

(Continued)

(56) References Cited

U.S. PATENT DOCUMENTS 11,880,318 B2 * 1/2024 Ramos ................ G06F 13/1673
2012/0236769 A1    9/2012 Powell et al.

(Continued)

FOREIGN PATENT DOCUMENTS

| JP | 2015169993 | 9/2015 |
| JP | 2017143327 | 8/2017 |
| KR | 20090063459 | 6/2009 |

OTHER PUBLICATIONS

Japan Patent Office; International Search Report and Written Opinion issued in PCT Application No. PCT/IB2022/052722, 12 pages, dated Jun. 21, 2022.

*Primary Examiner* — Azizul Choudhury
(74) *Attorney, Agent, or Firm* — Gray Ice Higdon (57) ABSTRACT

Implementations are described herein for commissioning a device such as a distributed control node (DCN) for operation with a process automation system (PAS) using a portable setup device (PSD) and an "out-of-band" communication channel. In various implementations, static information conveyed by a passive data store of the DCN may be used to establish an out-of-band communication channel between the DCN and PSD. The out-of-band communication channel may be distinct from a process automation network through which the DCN is to be communicatively coupled with other process automation nodes of the PAS. The DCN may be commissioned to the process automation system by exchanging operational technology (OT) data between the DCN and the PSD via the out-of-band communication channel to enable the DCN to cooperate with one or more of the other process automation nodes on the process automation network to implement an at least partially automated process.

19 Claims, 7 Drawing Sheets

(58) Field of Classification Search
CPC ...... G06K 7/1417; H04W 76/10; H04W 4/50; H04L 41/0806; H04L 67/34; H04L 67/12
See application file for complete search history.

(56) References Cited

U.S. PATENT DOCUMENTS

| | | |
|---|---|---|
| 2014/0156281 A1 | 6/2014 | Boyd et al. |
| 2015/0362900 A1 | 12/2015 | Noguchi |
| 2016/0065656 A1* | 3/2016 | Patin ................ H04L 67/10 709/201 |
| 2016/0103970 A1 | 4/2016 | Liu et al. |
| 2016/0246273 A1 | 8/2016 | Takahashi |
| 2017/0041427 A1* | 2/2017 | Dhawan ............ H04L 41/40 |
| 2018/0150061 A1 | 5/2018 | Yang et al. |
| 2022/0308555 A1* | 9/2022 | Malm ............... G06K 7/1417 |

\* cited by examiner

COMMISSIONING DEVICES TO PROCESS AUTOMATION SYSTEMS USING PORTABLE SETUP DEVICES

BACKGROUND

A process automation system may include one or more process automation networks. A process automation network may be the primary communication channel(s) over which devices such as distributed control nodes (DCNs) communicate with other nodes of the process automation system such as other DCNs, sensors, actuators, etc. Process automation networks are typically implemented using communication technologies that are reliable, fast, and that have considerable bandwidth, such as Ethernet.

SUMMARY

In some process automation systems, the process automation network itself may be used to commission devices such as DCNs to operate as part of the process automation system. However, this raises difficulties when a to-be-added device such as a DCN has not been configured with parameters necessary to join, receive, and/or transmit data over the process automation network. This issue is sometimes addressed by pre-configuring the to-be-added device to some known, static network configuration. However, this may require that a knowledgeable system integrator set up a separate sub-network to match to the static network configuration of the device, before setting the device to the preferred network configuration of the process automation network. Additionally, device configuration, application deployment, or application upgrade is performed as a manual process by a system integrator, which can lead to errors, mistakes, overuse of resources, among other negative outcomes.

Implementations are described herein for commissioning a device such as a DCN for operation on a process automation network using a portable setup device (PSD) and an "out-of-band" communication channel. More particularly, but not exclusively, techniques are described herein for establishing the out-of-band communication channel between the DCN and the PSD, so that the PSD can obtain, provide, and/or relay configuration data to the DCN. This PSD may be, for instance, a mobile telephone, a tablet computer, a laptop computer, a smart watch, or any other mobile device that can be brought into relatively close proximity with the DCN that is being commissioned.

The out-of-band communication channel may be outside of, and therefore distinct from, the process automation network that is used by devices such as DCNs to communicate with each other. For example, in some implementations, the out-of-band communication channel may be implemented using a peer-to-peer (P2P) communication technology such as Wi-Fi direct, two-way near-field communication (NFC), Bluetooth, etc. (although it is not required that the out-of-band communication be P2P in all cases). By utilizing such an out-of-band communication channel, more of the device configuration can be performed without manual intervention or effort. Moreover, the process automation network itself is not burdened with—or exposed to—data exchanged during commissioning of devices such as DCNs. Thus, techniques described herein reduce errors, decrease an amount of time, effort, and expertise required to onboard and/or replace devices such as DCNs, and may provide increased security for the process automation network.

In various implementations, a to-be-commissioned device such as a DCN may be equipped with a "passive data store" that includes static information that is usable to establish the out-of-band communication channel with the DCN. A passive data store, which may be integral with and/or affixed upon the device, may take various forms, including but not limited to visual indicia such as bar code or quick review (QR) code, or a passive electronic tag that conveys the static information using radio waves, such as a radio frequency identification (RFID) or near-field communication (NFC) transmitter. Likewise, a PSD may include one or more sensors (e.g., vision sensors, RFID sensors, etc.) that are configured to detect the static information conveyed by the passive data store. In some cases, such as where the passive data store is a RFID or NFC transmitter, the PSD's sensors may also activate the passive data store.

The static information conveyed by the passive data store may enable the PSD to establish the out-of-band connection with the DCN. For example, the static information may include an identifier of a P2P wireless interface of the DCN, such as an internet protocol (IP) address for Wi-Fi direct or a Bluetooth address (BD_ADDR) for communication on a piconet. Once the PSD establishes the out-of-band communication channel using these data, it may provision (e.g., push, relay) information technology (IT) and/or operational technology (OT) configuration data to a to-be-commissioned device such as a DCN via the out-of-band communication channel.

IT configuration data may enable a device such as a DCN to engage in network communication with other nodes on the process automation network. IT configuration data may include networking parameters that can be used to join and/or communicate over the process automation network. These parameters may include, for instance an IP address, an IP subnet mask, etc. IT configuration data may also include non-OT-specific data associated with hardware or software of the device, such as firmware or operating system (OS) updates, redundancy policies, security policies, etc.

OT configuration data, by contrast, may enable a device such as a DCN to cooperate with (e.g., exchange commands and/or sensor data with) one or more actuators or sensors on the process automation network to implement an at least partially automated process. OT configuration data for a DCN may include, among other things: process automation applications to be installed on and/or operated by a DCN; a range limit to be imposed on/by the DCN; a preferred unit of measurement to be used by the DCN; an update frequency to be implemented by the DCN; one or more analog-to-digital conversion parameters to be used by the DCN; information about (e.g., roles of) other nodes in the process automation system; one or more signal conditioning parameters to be used by the DCN; security credentials for operation in the process automation system; error correction parameters (e.g., error correction code techniques) to be used by the DCN; etc.

Various security measures may be implemented to protect against unauthorized PSDs, as well as against unauthorized process automation nodes. To ensure that only authorized PSDs are able to establish the out-of-band communication channel with DCNs, in some implementations, the static information conveyed by the passive data store may be wholly or partially encrypted. Only devices (e.g., PSDs) that have been provided with appropriate credentials (e.g., public keys) may be able to decrypt this static information. These credentials may be provided to authorized PSDs, e.g., by vendor systems associated with to-be-commissioned DCNs, as part of a delivery of DCN(s) to a process automation facility. In some implementations, a PSD may need to be authenticated prior to receiving the credentials, e.g., using a username and/or password, two-factor authentication, etc. Additionally or alternatively, various techniques may be implemented to ensure that only authorized DCNs are able to be commissioned to the process automation system. In some implementations, at least some of the static information contained in the passive data store (e.g., serial number, credentials, etc.) may be cross-checked by the PSD separately, e.g., against a list of DCNs that are supposed to be commissioned to the process automation facility.

In some implementations, the process of commissioning the DCN using the PSD and out-of-band communication channel may be relatively free of human intervention. However, this is not required. In some implementations, the PSD may have a display, and a graphical user interface (GUI) may be rendered on the display and may be operable to control how at least some of the OT and/or IT data is implemented/stored/installed on the DCN. For example, the GUI may allow a system integrator to tailor various networking and/or OT parameters as needed. In some implementations, the GUI may be operable to authenticate the system integrator, so that commissioning may ensue.

In some implementations, a method for commissioning a DCN for operation as part of a process automation system may be implemented using one or more processors and may include: detecting, via one or more sensors of a portable setup device (PSD), static information conveyed by a passive data store of the DCN; based on the static information, establishing an out-of-band communication channel between the DCN and the PSD, wherein the out-of-band communication channel is outside of a process automation network through which the DCN is to be communicatively coupled with other process automation nodes of the process automation system; and commissioning the DCN to the process automation system, wherein the commissioning includes exchanging operational technology (OT) data between the DCN and the PSD via the out-of-band communication channel to enable the DCN to cooperate with one or more of the other process automation nodes on the process automation network to implement an at least partially automated process.

In various implementations, the commissioning may include exchanging information technology (IT) data between the DCN and the PSD via the out-of-band communication channel to enable the DCN to join the process automation network.

In various implementations, the OT data may include one or more OT capabilities of the DCN, and the method may further include: transmitting a request for OT configuration data from the PSD to a remote computing system, wherein the request for OT configuration data is generated based on the one or more OT capabilities of the DCN; receiving the OT configuration data at the PSD; and pushing the OT configuration data to the DCN over the out-of-band communication channel, wherein the pushing causes the OT configuration data to be installed on the first DCN to facilitate the cooperation between the DCN and one or more of the other process automation nodes of the process automation system to implement the at least partially automated process. In various implementations, the request may be transmitted from the PSD to the remote computing system over the process automation network. In various implementations, the request may be transmitted from the PSD to the remote computing system over a wireless network that is separate from the process automation network. In various implementations, the PSD may take the form of a mobile telephone and the wireless network may be a cellular network.

In various implementations, the passive data store may include visual indicia or a passive electronic tag that conveys the static information using radio waves. In various implementations, the static information conveyed by the passive data store may be encrypted, and the method may include decrypting the static information at the PSD. In various implementations, the out-of-band communication channel may be implemented using Bluetooth, two-way near-field communication (NFC), or Wi-Fi direct. In various implementations, the method may further include rendering, on a display of the PSD, a graphical user interface (GUI), wherein the GUI is operable to implement at least some of the OT data on the DCN.

In another aspect, a PSD may include one or more sensors and circuitry to: receive, from one or more of the sensors, static information detected from a passive data store of a distributed control node (DCN), wherein the DCN is to be commissioned for operation as part of a process automation system; based on the static information, establish an out-of-band communication channel with the DCN, wherein the out-of-band communication channel is outside of a process automation network through which the DCN is to be communicatively coupled with other process automation nodes of the process automation system; and relay operational technology (OT) configuration data obtained from a remote computing system to the DCN over the out-of-band communication channel to cause the OT configuration data to be installed on the DCN, thereby commissioning the DCN to cooperate with one or more of the other process automation nodes on the process automation network to implement an at least partially automated process.

In another aspect, a DCN may include: first and second communication interfaces; a passive data store that is readable wirelessly by a sensor of a portable setup device (PSD), wherein the passive data store is configured to convey static information about establishing an out-of-band communication channel with the first communication interface of the DCN, wherein the out-of-band communication channel is outside of a process automation network through which the DCN is to be communicatively coupled with other process automation nodes of the process automation system via the second communication interface; and circuitry configured to: join the out-of-band communication channel between the first communication interface and the PSD; receive, over the out-of-band communication channel, operational technology (OT) and information technology (IT) configuration data relayed by the PSD from a remote computing system; based on IT configuration data, communicatively couple the second communication interface with the process automation network; and based on the OT configuration data, exchange data with one or more of the other process automation nodes on the process automation network to implement an at least partially automated process.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

As used herein, an "at least partially automated process" includes any process cooperatively implemented within a process automation system by multiple devices with little or no human intervention. One common example of an at least partially automated process is a process loop in which one or more actuators are operated automatically (without human intervention) based on output of one or more sensors. Some at least partially automated processes may be sub-processes of an overall process automation system workflow, such as a single process loop mentioned previously. Other at least partially automated processes may comprise all or a significant portion of an entire process automation system workflow. In some cases, the degree to which a process is automated may exist along a gradient, range, or scale of automation. Processes that are partially automated, but still require human intervention, may be at or near one end of the scale. Processes requiring less human intervention may approach the other end of the scale, which represents fully autonomous processes. Process automation in general may be used to automate processes in a variety of domains, e.g., manufacture, development, and/or refinement of chemicals (e.g., chemical processing), catalysts, machinery, etc.

Figure 1:
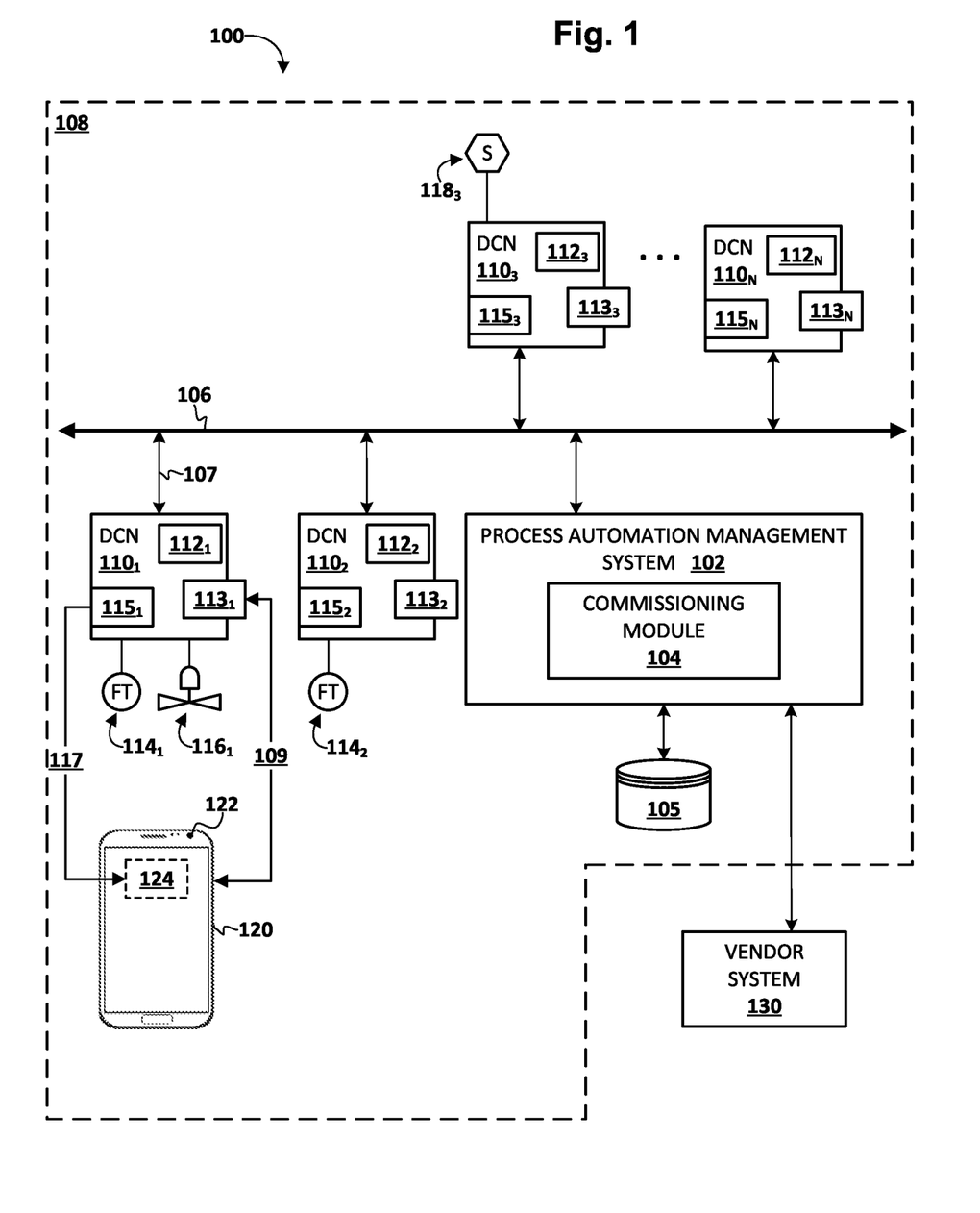
FIG. 1 and FIG. 2 schematically depict how selected aspects of the present disclosure may be implemented in a particular scenario, in accordance with various embodiments.

Referring now to FIG. 1, an example environment 100 in which various aspects of the present disclosure may be implemented is depicted schematically. A process automation management system 102 is operably coupled with a process automation network 106 in a process automation facility 108. Process automation facility 108 (alternatively referred to herein as "process automation system 108") may take numerous forms and may be designed to implement any number of at least partially automated processes. For example, process automation facility 108 may form all or part of a chemical processing plant, an oil or natural gas refinery, a catalyst factory, a manufacturing facility, etc.

Process automation network 106 may be implemented using various wired and/or wireless networks, including but not limited to the Institute of Electrical and Electronics Engineers (IEEE) 802.3 standard (Ethernet), IEEE 802.11 (Wi-Fi), cellular networks such as 3GPP Long Term Evolution ("LTE") or other wireless protocols that are designated as 3G, 4G, 5G, and beyond, and/or other types of communication networks of various types of topologies (e.g., mesh). Process automation is often employed in scenarios in which the cost of failure tends to be large, both in human safety and financial cost to stakeholders. Accordingly, in various implementations, process automation network 106 may be configured with redundancies and/or backups to provide high availability (HA) and/or high quality of service (QoS).

Process automation management system 102 may include a commissioning module 104 and a database 105 that stores information used by commissioning module 104 to commission new devices to process automation facility 108. Various aspects of process automation management system 102, such as commissioning module 104, may be implemented using any combination of hardware and software. In some implementations, process automation management system 102 may be implemented across multiple computer systems as part of what is often referred to as a "cloud infrastructure" or simply the "cloud." However, this is not required, and in FIG. 1, for instance, process automation management system 102 is implemented within process automation facility 108, e.g., in a single building or across a single campus of buildings or other industrial infrastructure. In such an implementation, process automation management system 102 may be implemented on one or more local computing systems, such as on one or more server computers.

In addition to process automation management system 102, a variety of other nodes/devices are operably/communicatively coupled with process automation network 106. In FIG. 1, for instance, N (positive integer) DCNs $110_{1-N}$ are operably/communicatively coupled with process automation network 106. Each DCN may include circuitry or logic 112 that may take various forms, such as processor(s) that execute instructions in memory, a field-programmable gate array (FPGA), an application-specific integrated circuit (ASIC), and so forth. Each DCN 110 may have a particular role to play in process automation facility 108. "Compute" DCNs, for instance, may control a process loop (e.g., a chemical process loop) in which various "field" devices (e.g., devices having sensors and/or actuators) interface with each other to perform some number of function control blocks (FBs).

Each DCN 110 may have various input/output (I/O) and other hardware components that dictate at least some of its OT capabilities and, more generally, its role at process automation facility 108. OT capabilities may vary widely among industries. In some cases, OT capabilities may include, but are not limited to, a count of I/O channels; one or more types of one or more I/O channels (e.g., types of actuators, types of sensors, etc.); a range limit; a nominal unit of measurement; a nominal update frequency; one or more analog-to-digital conversion parameters; one or more signal conditioning parameters; supported open standard protocols such as the Open Platform Communications (OPC) Unified Architecture (OPC UA) and/or Modbus; or any combination thereof. In FIG. 1, for instance, first DCN $110_1$ includes a flow transmitter (FT) component $114_1$ and an actuator (e.g., a valve) $116_1$. Second DCN $110_2$ includes a FT component $114_2$ but no actuator. Third DCN $110_3$ includes a sensor $118_3$ but no actuator.

Actuators 116 may be any electric, hydraulic, mechanical, and/or pneumatic component that is controllable to affect some aspect of a process automation workflow that occurs at process automation facility 108. In many cases, an actuator 116 may perform its function in response to various signals, such as sensor signals or commands from compute DCNs (which themselves may monitor for sensor signals). Some non-limiting examples of actuators 116 include, but are not limited to, valves, pistons, rotors, switches, heaters, coolers, stirrers, injectors, devices to create vacuums, belts, tracks, gears, grippers, motors, relays, servomechanisms, etc. A sensor 118 may take various forms. Some examples of sensors 118 may include but are not limited to a pressure sensor, a temperature sensor, a flow sensor (e.g., FT component 114), various types of proximity sensors, a light sensor (e.g., a photodiode), a pressure wave sensor (e.g., microphone), a humidity sensor (e.g., a humistor), a radiation dosimeter, a laser absorption spectrograph (e.g., a multi-pass optical cell), and so forth.

Unlike DCNs $110_{1-3}$, $DCN_N$ does not include any input/output (actuators or sensors). Instead, $DCN_N$ may be a "compute only" DCN whose role is to facilitate cooperation between itself and one or more other DCNs 110 on process automation network 106 to implement an at least partially automated process. For example, DCN $110_N$ may control a single process loop (e.g., a chemical process control loop) that involves one or more other DCNs 110. In some cases, such a compute DCN 110 may perform a role similar to an autopilot on an airplane—the compute DCN 110 may receive various signals and, based on those signals and various criteria and/or thresholds, control various actuators. For example, the compute DCN 110 may monitor various sensors 118 and/or FT components 114 to ascertain data about chemical levels, flow rates (e.g., across valves), tank temperatures, control rates, etc., and may control one or more actuators 116 based on these data and/or comparisons of these data to various criteria and/or thresholds. For instance, compute DCN $110_N$ can control actuator $116_1$ by transmitting, to DCN $110_1$, corresponding command(s) that can optionally conform to a protocol that is specific to DCN $110_1$.

As noted previously, commissioning DCNs to process automation network 106, whether as new additions, replacements, or upgrades, can be complicated and cumbersome, e.g., due to the commissioning process being performed at least in part by exchanging data over process automation network 106. Accordingly, improved techniques are described herein for commissioning a device such as a DCN 110 for operation on a process automation network using a portable setup device (PSD) 120 and an "out-of-band" communication channel 109. More particularly, but not exclusively, techniques are described herein for establishing out-of-band communication channel 109 between the DCN 110 and PSD 120, so that PSD 120 can obtain, provide, and/or relay configuration data to the DCN 110. A DCN 110 may be commissioned using techniques described herein under a variety of circumstances, such as expanding capabilities of process automation facility 108, replacing underperforming, malfunctioning, disabled, or obsolete nodes, repurposing nodes, bringing process automation facility 108 into conformance with various standards, etc.

Figure 2:
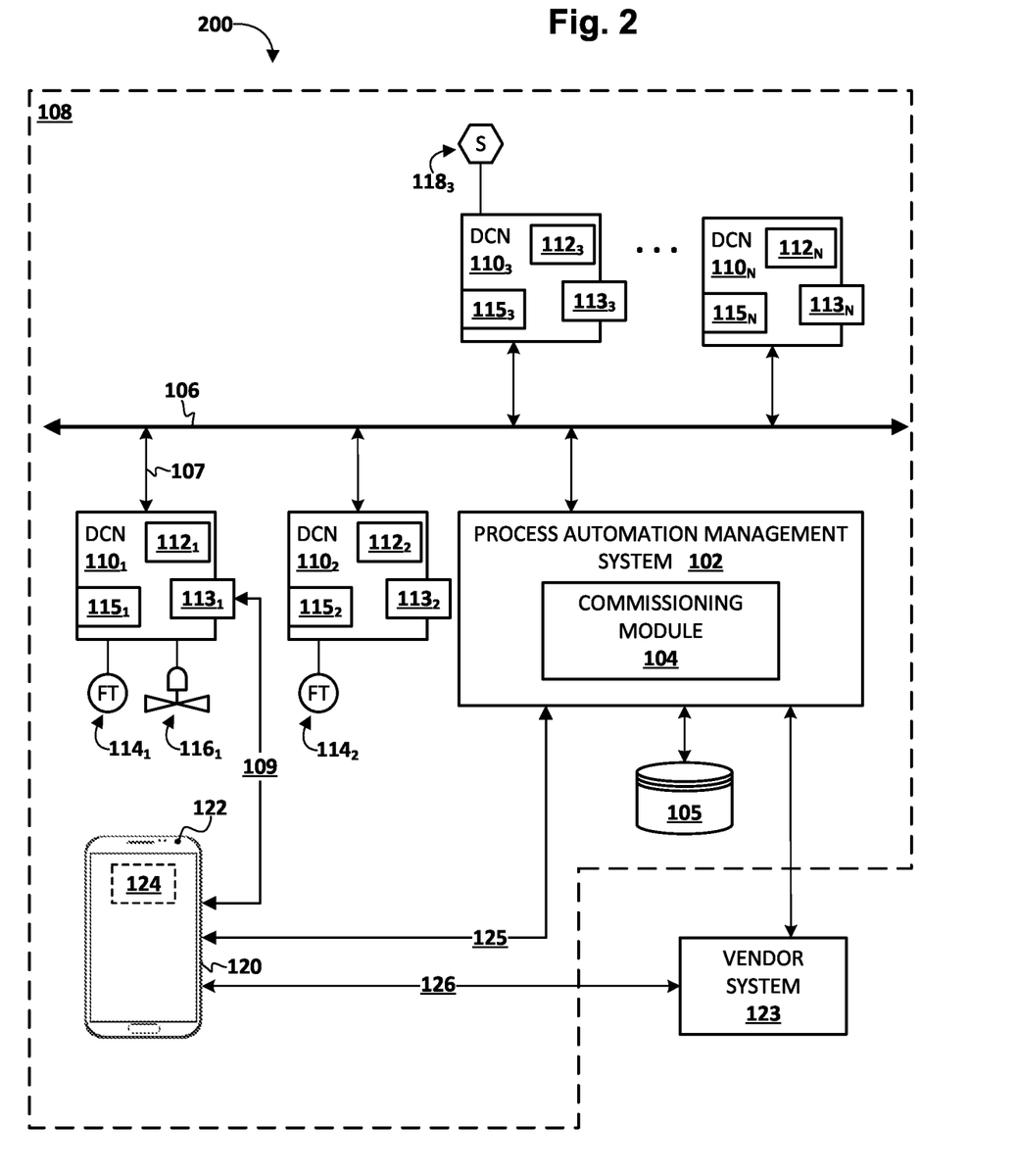

FIGS. 1 and 2 depict a scenario in which first DCN $110_1$ is being commissioned for operation in process automation facility 108. In FIGS. 1 and 2, each DCN 110 includes a respective communication interface 113 that is usable to establish out-of-band communication channel 109 between DCN $110_1$ and PSD 120. As mentioned previously, PSD 120 may take various form factors. In FIG. 1, PSD 120 takes the form of a mobile telephone, but in other implementations, PSD 120 may be a mobile device having a different form factor, such as a tablet computer, a laptop computer, a wearable smart device such as a smart watch or head-mounted display, etc. Interfaces $113_{1-N}$ may all support the same communication technology, or they may support varying communication technologies, and may or may not be wireless personal area network (PAN) interfaces. For example, interface $113_1$ may facilitate Bluetooth communication and interface $113_2$ may facilitate NFC or Wi-Fi Direct communication.

The out-of-band communication channel 109 that is established between interface 113 of DCN $110_1$ and PSD 120 is outside of process automation network 106. Out-of-band communication channel 109 may or may not be temporary. In scenarios in which process automation network 106 is implemented using Ethernet, a connection 107 between a DCN 110 and process automation network 106 may be a registered jack (RJ) 45 connection in some implementations. In various implementations, out-of-band communication channel 109 may be implemented using different communication technologies such as NFC, Bluetooth, Wi-Fi direct, etc. In many implementations, out-of-band communication channel 109 may be wireless, although this is not required in all cases.

Each DCN 110 in FIGS. 1 and 2 includes a passive data store 115. Passive data store 115 may be a mechanism that conveys static information that enables other devices, such as PSD 120, to establish out-of-band communication channel 109 with the DCN 110. In various implementations, passive data store 115 may be integral with and/or affixed upon a respective DCN 110. Passive data store 115 may be capable of conveying this static information to other devices within a particular range, e.g., in relatively close proximity.

Passive data store 115 is referred to herein as "passive" because it may be only capable of one-way communication—it may not be capable of receiving data. In many implementations, passive data store 115 may be unpowered. For example, passive data store 115 may take the form of visual indicia such as bar code or quick review (QR) code, or a passive electronic tag that conveys the static information using radio waves, such as a radio frequency identification (RFID), near-field communication (NFC) transmitter, etc. In other implementations, passive data store 115 may be powered, and may take the form of a low energy transmitter such as a Bluetooth beacon.

PSD 120 may include one or more sensors that are configured to detect the static information conveyed by passive data store 115, as shown by the one-way arrow 117 in FIG. 1. In some cases, such as where the passive data store is an unpowered transmitter such as an RFID or NFC transmitter, the PSD's sensors may also activate the passive data store. In FIG. 1, PSD 120 includes one or more vision sensors 122 (e.g., front-facing and/or rear-facing digital cameras common on smart phones) that are capable of detecting static information conveyed by visual indicia such as bar codes or QR codes. Alternatively, digital images captured by vision sensor(s) 122 may undergo optical character recognition (OCR) processing to detect the static information, e.g., in the form of text disposed on a surface of DCN 110. PSD 120 also includes a radio sensor 124 that can be operated to detect static information from passive data stores 115 that take other forms, such as RFID tags, NFC tags, Bluetooth beacons, etc.

PSD 120 may use the static information collected at 117 to establish out-of-band communication channel 109 with first interface $113_1$ of first DCN $110_1$. First DCN $110_1$ and PSD 120 may then use out-of-band communication channel 109 to exchange IT and/or OT data that is usable to commission first DCN $110_1$ for operation in process automation facility 108. In some implementations, PSD 120 may obtain IP and/or OT configuration needed to commission first DCN $110_1$ from a remote computing system, such as process automation management system 102. In some such implementations, and as depicted in FIG. 2, PSD 120 may establish and/or join a commissioning communication channel network 125 with process automation management system 102. Commissioning communication channel network 125 may or may not be separate from process automation network 106 and may be implemented in various ways. In some implementations, commissioning communication channel network 125 may be established wirelessly between PSD 120 and process automation management system 102, e.g., via one or more Wi-Fi or cellular networks.

For example, first DCN $110_1$ may transmit data indicative of its OT capabilities over out-of-band communication channel 109 to PSD 120. Based on these OT capabilities, PSD 120 may use commissioning communication channel network 125 to request, e.g., from commissioning module 104 or another DCN 110, OT configuration data that PSD 120 may then transmit (e.g., push, relay) to first DCN $110_1$ over out-of-band communication channel 109. This OT configuration data may be used, e.g., by first DCN $110_1$, to cooperate with other process nodes (e.g., DCNs $110_{2-N}$) to implement at least partially automated processes in process automation facility 108.

Similarly, PSD 120 may use commissioning communication channel network 125 to request, e.g., from commissioning module 104, IT configuration data that PSD 120 may then transmit (e.g., push, relay) to first DCN $110_1$ over out-of-band communication channel 109. In various implementations, the IT configuration data may include networking parameters such as an IP address (e.g., a new IP address if first DCN $110_1$ is being added to process automation facility 108 or an IP address of another node being replaced by first DCN $110_1$) and/or a subnet mask, as well as other networking parameters and/or tools, such as a public encryption key, a certificate, time-sensitive networking parameters, domain name system (DNS) lookup tables, etc. This IT configuration data may be installed on first DCN $110_1$ so that first DCN $110_1$ may join and exchange data over process automation network 106.

In some implementations, e.g., before PSD is able to provide OT and/or IT configuration data to first DCN $110_1$ over out-of-band communication channel 109, PSD 120 and/or commissioning module 104 may authenticate first DCN $110_1$ to ensure that first DCN $110_1$ is legitimate and does not pose a security risk to process automation network 106. In FIG. 1, for instance, PSD 120 is operably coupled via one or more networks 126 (e.g., cellular networks, the Internet) with one or more vendor systems 123. Vendor system 123 may be associated with a vendor (not depicted) of one or more components (e.g., DCNs $110_{1-N}$) used in process automation facility 108.

In some cases, vendor system 123 may be configured to authenticate various types of credentials forwarded to it by PSD 120 (or process automation management system 102) using a variety of different authentication techniques. As one non-limiting example, each DCN 110 may be provided with a public encryption key from its respective vendor. PSD 120 and/or process automation management system 102 may use this public key to encrypt some piece of handshake data that is then sent to the respective vendor system 123. The vendor system 123 may use its own private key to decrypt the handshake data. If the decryption is successful, the DCN 110 may be authenticated, and PSD 120 may be permitted to perform its role in commissioning the DCN 110. Other variations of public key encryption are contemplated. In other implementations, PSD 120 may provide other credentials, such as a digital certificate, that a respective vendor system 123 may validate before PSD 120 is permitted to perform techniques herein to commission the DCN to process automation facility 108.

In some implementations, vendor system 123 may verify not only the legitimacy of a DCN 110, but also whether the DCN 110 conforms to desired/requested criteria associated process automation facility 108. For example, various identification information associated with the added DCN 110, such as a serial number, model number, lot number, etc., may be cross-referenced with a purchase and/or work order created for process automation facility 108. Additionally or alternatively, IT and/or OT capabilities of the added DCN 110 may be compared with known parameters of process automation facility 108 and/or process automation network 106 to ensure compatibility. In some implementations, vendor system 123 may push digital keys/certificates and/or other data that includes these data to process automation management system 102 so that commissioning module 104 can perform these checks locally. As an example, for a large purchase order of DCNs, the vendor system 123 may provide a file or list of relevant information about the new DCNs (e.g., serial/model numbers, capabilities, etc.) that can be used locally by commissioning module 104 to perform these checks.

Figure 3:
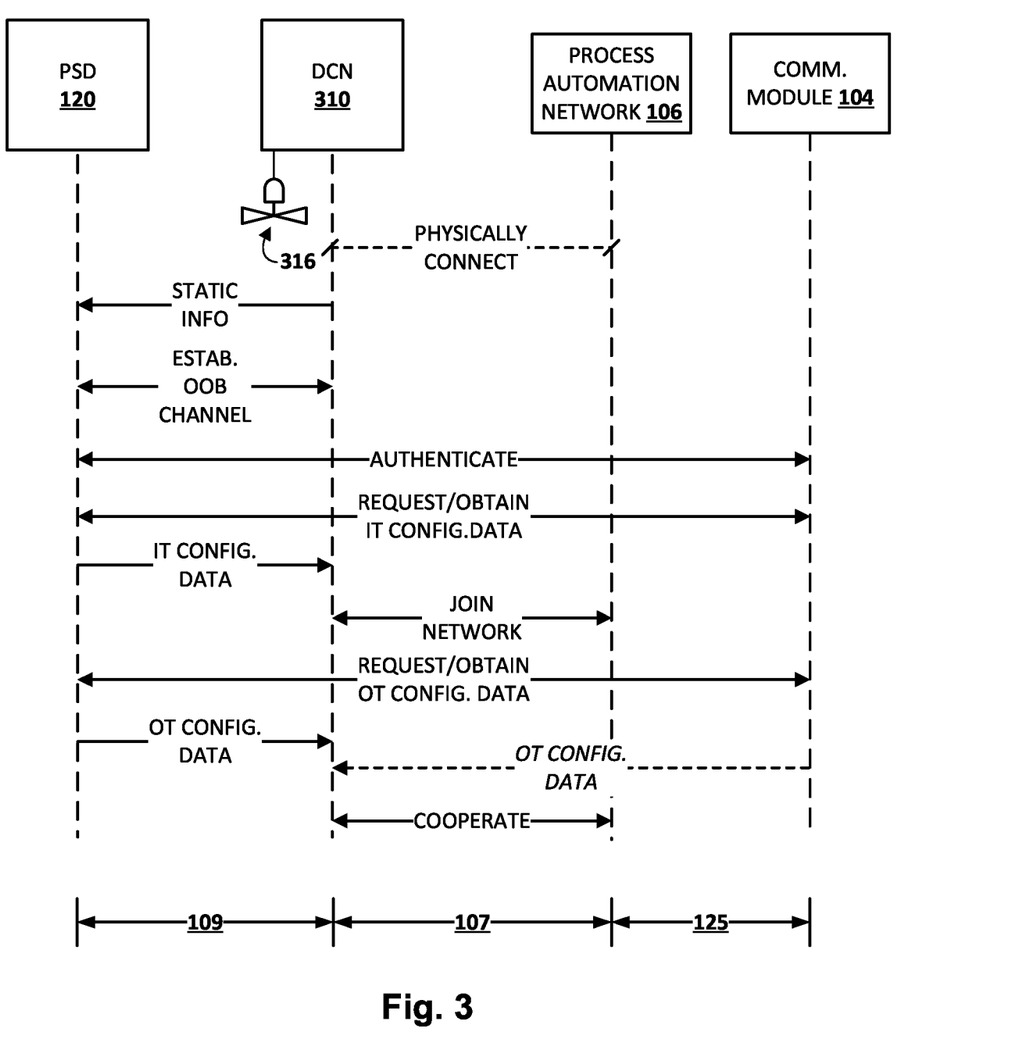
FIG. 3 schematically depicts another example of how techniques described herein may be implemented, in accordance with various embodiments.

Referring now to FIG. 3, an example process flow is depicted schematically between a to-be-provisioned DCN 310, a PSD 120, process automation network 106, and commissioning module 104. In FIG. 3, time advances downward on the page. In some cases, the process may start with DCN 310 (which includes an actuator 316) being physically connected with process automation network 106, e.g., using RJ-45 connection 107, although this is not required. If such a physical connection is made, DCN 310 may be unable initially to join or exchange data over process automation network 106 because DCN 310 lacks proper network parameters.

Meanwhile, in FIG. 3, PSD 120 is brought into sufficient proximity (e.g., within wireless range or close enough to detect visual indicia) of DCN 310 to detect the static information provided by the passive data store (not depicted in FIG. 3, 115 in FIGS. 1-2). Using this static information (e.g., IP address, BD_ADDR), PSD establishes out-of-band communication channel 109 with DCN 310.

In some implementations, and as shown by the next arrow down in FIG. 3, PSD 120 may need to authenticate itself to commissioning module 104 (e.g., by presenting credentials to process automation management system 102) prior to commissioning DCN 310. Various types of authentication may performed by PSD 120, such as username and/or password, digital certificate authentication, two-factor authentication, etc. In some implementations in which process automation network 106 includes a Wi-Fi subnet, PSD 120 may need to be have been authenticated already to join the Wi-Fi subnet, in which case that authentication may carry over to when PSD 120 is operated to commission DCN 310 to process automation network 106.

Once PSD 120 is authenticated, it may request and/or obtain/receive, e.g., from commission module 104 over commissioning communication channel network 125 as shown in FIG. 3 or over another network, IT configuration data. PSD 120 may then transmit (e.g., push, relay) all or a portion of this IT configuration data to DCN 310 via out-of-band communication channel 109. This IT configuration data may be usable by DCN 310 to join process automation network 106.

Similarly, PSD 120 may request and/or receive, e.g., from commission module 104 over commissioning communication channel 125 as shown in FIG. 3 or over another network, OT configuration data. PSD 120 may then transmit (e.g., push, relay) all or a portion of this OT configuration data to DCN 310 via out-of-band communication channel 109. This OT configuration data may be usable by DCN 310 to cooperate with other node(s) on process automation network 106 to implement an at least partially automated process.

In FIG. 3, the IT configuration data is pushed by PSD 120 to DCN 310 before OT configuration data. However, this is not meant to be limiting. In other implementations, OT configuration data may be pushed before IT configuration data, or IT and OT configuration data may be pushed by PSD 120 to DCN 310 in parallel. Additionally, and as indicated by the dashed arrow from commissioning module 104 to DCN 310, in some implementations, if DCN 310 has successfully joined process automation network 106, OT configuration data may be pushed directly to DCN 310, instead of being relayed to DCN 310 by PSD 120.

Subsequently, DCN 310 may cooperate with various other process automation nodes that are communicatively coupled with process automation network 106, e.g., by exchanging commands and/or sensor data with them over process automation network 106, to implement an at least partially automated process. Once DCN 310 is able to exchange data over process automation network 106, in some implementations, DCN 310 or PSD 120 may close out-of-band communication channel 109.

Figure 4:
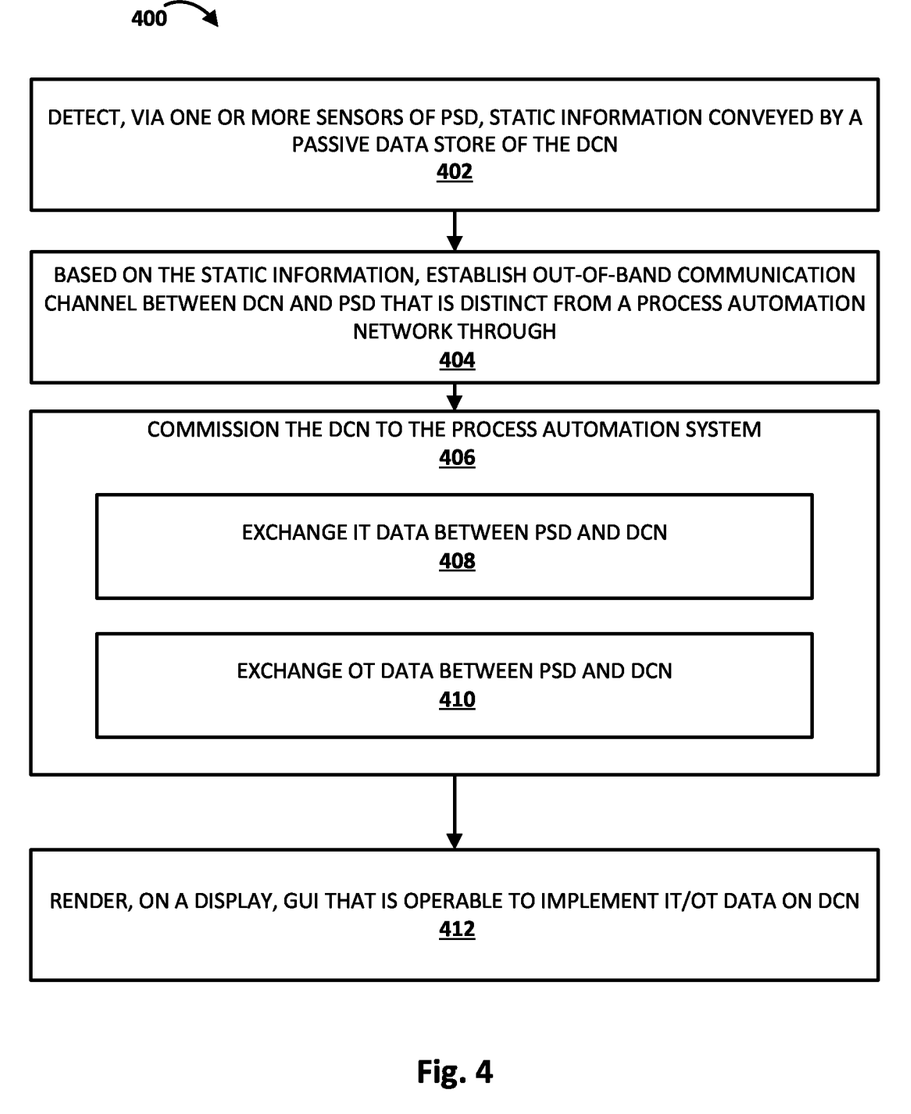
FIG. 4 illustrates an example method for performing selected aspects of the present disclosure.

FIG. 4 is a flowchart illustrating an example method 400 for commissioning a DCN for operation as part of a process automation system, in accordance with implementations disclosed herein. For convenience, the operations of the flow chart are described with reference to a system that performs the operations. This system may include various components of various computer systems, such as one or more components of process automation management system 102, and/or other devices such as PSD 120 and/or DCNs 110/310. Moreover, while operations of method 400 are shown in a particular order, this is not meant to be limiting. One or more operations may be reordered, omitted or added.

At block 402, the system, e.g., by way of PSD 120, may detect, via one or more sensors (e.g., 122, 124), static information conveyed by a passive data store (e.g., 115) of the DCN. Based on the static information, at block 404, the system, e.g., by way of PSD 120, may establish an out-of-band communication channel (e.g., 109) between the DCN and the PSD. In various implementations, the out-of-band communication channel may be outside of a process automation network (e.g., 106) through which the DCN is to be communicatively coupled with other process automation nodes of the process automation system.

At block 406, the system, e.g., by way of PSD 120, may commission the DCN to the process automation system. In some implementations, the commissioning of block 406 may include, at block 408, exchanging IT data between the DCN and the PSD via the out-of-band communication channel to enable the DCN join the process automation network. Similarly, the commissioning of block 406 may include, at block 410, exchanging OT data between the DCN and the PSD via the out-of-band communication channel to enable the DCN to cooperate with one or more of the other process automation nodes on the process automation network to implement an at least partially automated process.

In some implementations, method 400 may be more or less fully automated. However, in some implementations, a user such as a system integrator may be able to intervene in the commissioning process, e.g., to tailor parameters to the specific process automation environment. For example, at block 412, the system, e.g., by way of PSD 120, may render, on a display, a GUI that is operable to implement IT and/or OT data on the DCN. In some implementations, the PSD or DCN may configure the IT/OT configuration in a particular (default) manner, but the GUI enables the user to make adjustments as needed.

Figure 5:
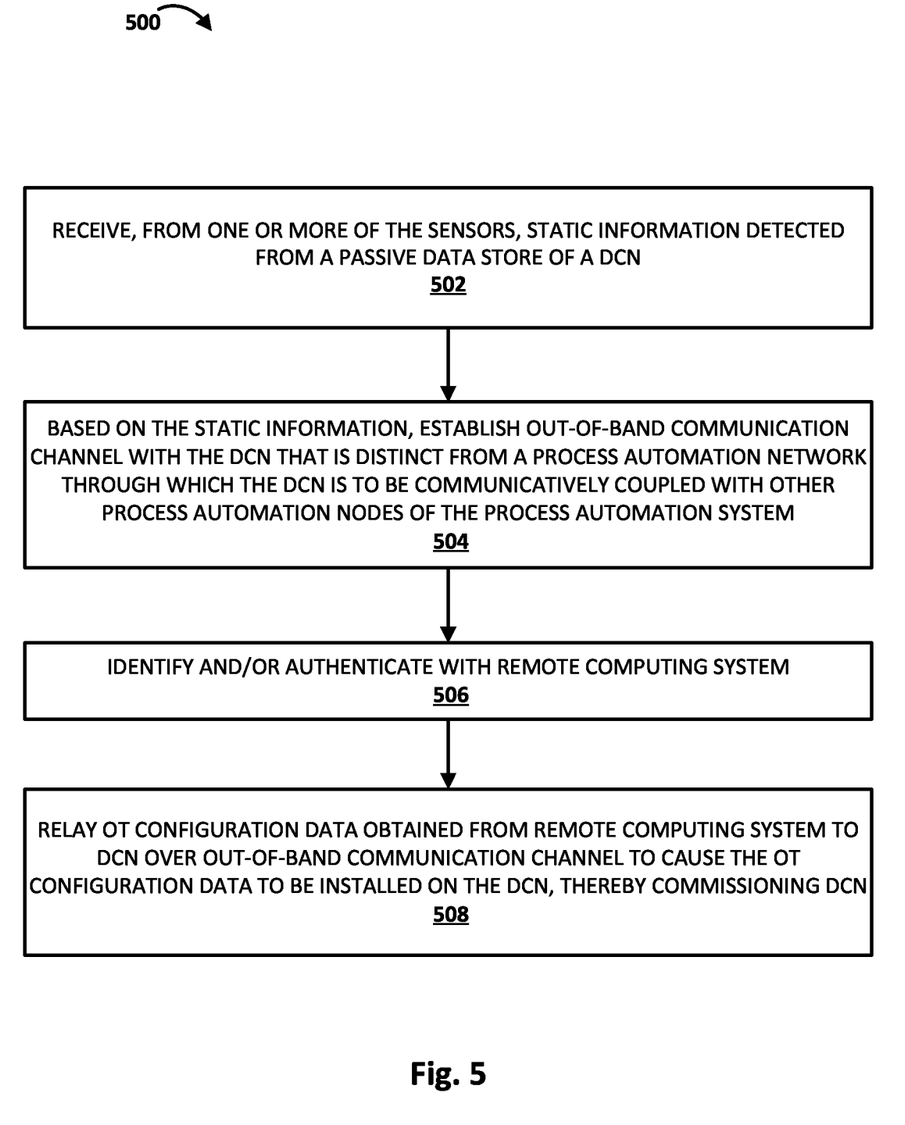
FIG. 5 illustrates another example method for performing selected aspects of the present disclosure.

FIG. 5 is a flowchart illustrating an example method 500 that is performable by a PSD, such as PSD 120, to practice selected aspects of the present disclosure, in accordance with implementations disclosed herein. While operations of method 500 are shown in a particular order, this is not meant to be limiting. One or more operations may be reordered, omitted or added.

At block 502, the PSD (e.g., 120) may receive, from one or more of its sensors (e.g., 122, 124), static information detected from a passive data store (e.g., 115) of a distributed control node (DCN), wherein the DCN is to be commissioned for operation as part of a process automation system. Based on the static information, at block 504, the PSD may establish an out-of-band communication channel (e.g., 109) with the DCN. As noted previously, the out-of-band communication channel may be outside of a process automation network through which the DCN is to be communicatively coupled with other process automation nodes of the process automation system.

At block 506, the PSD may identify and/or authenticate with a remote computing system, such as with process automation management system 102 and/or vendor system 123. Assuming authentication is successful, at block 508, the PSD may relay operational technology (OT) configuration data it obtained from the remote computing system to the DCN over the out-of-band communication channel. This may cause the OT configuration data to be installed on the DCN, e.g., by the PSD and/or by the DCN, thereby commissioning the DCN to cooperate with one or more of the other process automation nodes on the process automation network to implement an at least partially automated process.

Figure 6:
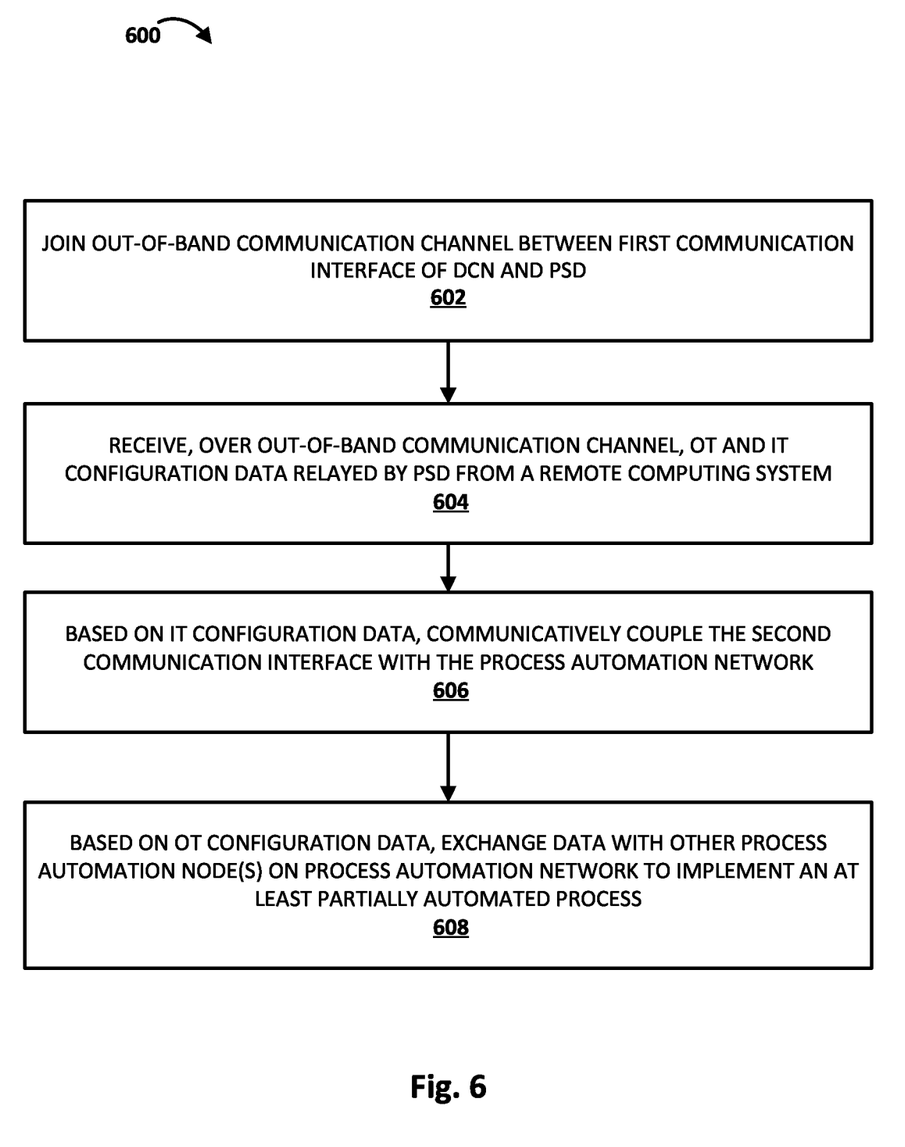
FIG. 6 illustrates another example method for performing selected aspects of the present disclosure.

FIG. 6 is a flowchart illustrating an example method 600 that is performable by a DCN, such as any of DCNs 110$_{1-N}$ or DCN 310, to practice selected aspects of the present disclosure, in accordance with implementations disclosed herein. While operations of method 600 are shown in a particular order, this is not meant to be limiting. One or more operations may be reordered, omitted or added.

At block 602, the DCN may join an out-of-band communication channel established between a first communication interface (e.g., wireless PAN interface such as 113 in FIGS. 1-2) and the PSD (e.g., 120). At block 604, the DCN may receive, over the out-of-band communication channel, OT and IT configuration data relayed by the PSD from a remote computing system, e.g., as depicted in FIG. 3.

Based on IT configuration data received at block 604, the DCN may communicatively another communication interface (e.g., 107 in FIGS. 1-2) with the process automation network. Based on the OT configuration data received at block 604, the DCN may exchange data with one or more of the other process automation nodes on the process automation network to implement an at least partially automated process.

Figure 7:
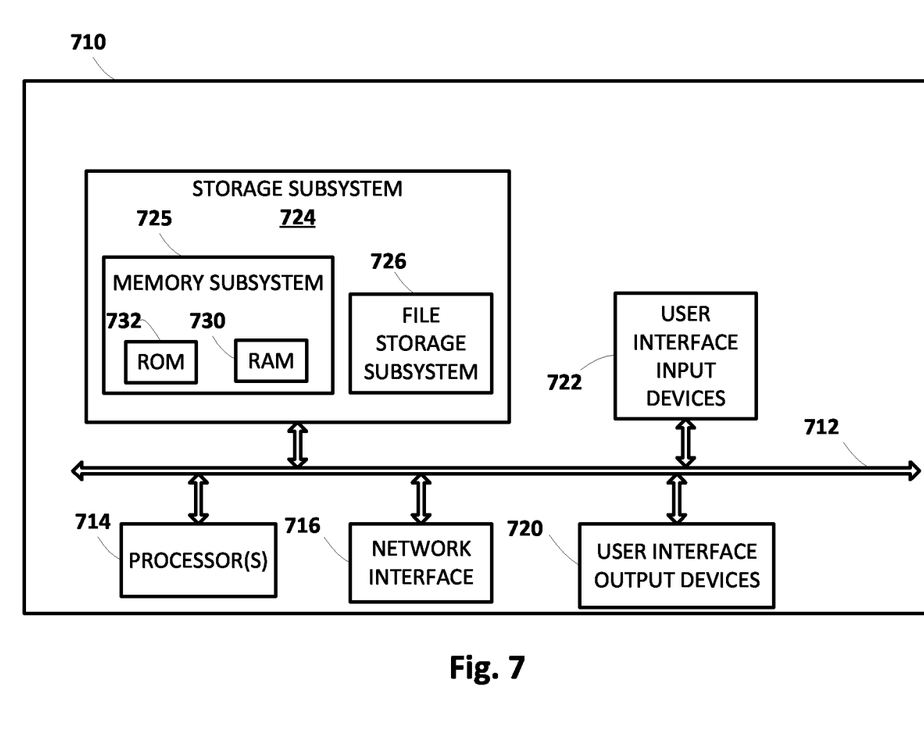
FIG. 7 schematically illustrates an example computer architecture on which selected aspects of the present disclosure may be implemented.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods of FIGS. 4-6, as well as to implement various components depicted in FIGS. 1-3.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for commissioning a distributed control node (DCN) for operation as part of a process automation system, the method implemented using one or more processors and comprising:
   detecting, via one or more sensors of a portable setup device (PSD), static information conveyed by a passive data store of the DCN, wherein the passive data store is readable wirelessly by one or more of the sensors of the PSD;
   based on the static information, establishing an out-of-band communication channel between a first communication interface of the DCN and the PSD, wherein the out-of-band communication channel is outside of a process automation network through which the DCN is to be communicatively coupled with other process automation nodes of the process automation system via a second communication interface of the DCN; and
   commissioning the DCN to the process automation system, wherein the commissioning includes:
      exchanging operational technology (OT) data between the DCN and the PSD via the out-of-band communication channel to enable the DCN to cooperate with one or more of the other process automation nodes on the process automation network to implement an at least partially automated process; and
      exchanging information technology (IT) data between the DCN and the PSD via the out-of-band communication channel to enable the DCN to join the process automation network.

2. The method of claim 1, wherein the OT data includes one or more OT capabilities of the DCN, and the method includes:
   transmitting a request for OT configuration data from the PSD to a remote computing system, wherein the request for OT configuration data is generated based on the one or more OT capabilities of the DCN;
   receiving the OT configuration data at the PSD; and
   pushing the OT configuration data to the DCN over the out-of-band communication channel, wherein the pushing causes the OT configuration data to be installed on the first DCN to facilitate the cooperation between the DCN and one or more of the other process automation nodes of the process automation system to implement the at least partially automated process.

3. The method of claim 2, wherein the request is transmitted from the PSD to the remote computing system over the process automation network.

4. The method of claim 2, wherein the request is transmitted from the PSD to the remote computing system over a wireless network that is separate from the process automation network.

5. The method of claim 4, wherein the PSD comprises a mobile telephone and the wireless network comprises a cellular network.

6. The method of claim 1, wherein the passive data store comprises visual indicia or a passive electronic tag that conveys the static information using radio waves.

7. The method of claim 1, wherein the static information conveyed by the passive data store is encrypted, and the method further includes decrypting the static information at the PSD.

8. The method of claim 1, wherein the out-of-band communication channel is implemented using Bluetooth, two-way near-field communication (NFC), or Wi-Fi direct.

9. The method of claim 1, further comprising rendering, on a display of the PSD, a graphical user interface (GUI), wherein the GUI is operable to implement at least some of the OT data on the DCN.

10. A portable setup device (PSD) comprising one or more sensors and circuitry to:
receive, from one or more of the sensors, static information detected from a wirelessly readable passive data store of a distributed control node (DCN), wherein the DCN is to be commissioned for operation as part of a process automation system;
based on the static information, establish an out-of-band communication channel with a first communication interface of the DCN, wherein the out-of-band communication channel is outside of a process automation network through which the DCN is to be communicatively coupled with other process automation nodes of the process automation system via a second communication interface of the DCN; and
relay operational technology (OT) configuration data and information technology (IT) configuration data obtained from a remote computing system to the DCN over the out-of-band communication channel to cause:
the second communication interface of the DCN to be communicatively coupled with the process automation network; and
the OT configuration data to be installed on the DCN, thereby commissioning the DCN to cooperate with one or more of the other process automation nodes on the process automation network to implement an at least partially automated process.

11. The PSD of claim 10, wherein the PSD receives the OT configuration data from the remote computing system over the process automation network.

12. The PSD of claim 10, wherein the PSD receives the OT configuration data from the remote computing system over a wireless network that is separate from the process automation network.

13. The PSD of claim 10, wherein one or more of the sensors is a vision sensor, and the passive data store comprises a bar code or quick review (QR) code.

14. The PSD of claim 10, wherein the circuitry is configured to identify the remote computing system based on the static information.

15. The PSD of claim 10, wherein the circuitry is configured to identify the remote computing system based on data exchanged over the out-of-band communication channel.

16. The PSD of claim 10, wherein the circuitry is configured to relay information technology (IT) data from the remote computing system to the DCN via the out-of-band communication channel, wherein the IT data enables the DCN to join the process automation network.

17. The PSD of claim 10, further comprising a display, wherein the circuitry is configured to render, on the display, a graphical user interface (GUI) that is operable to control how the OT configuration data is installed on the DCN.

18. A distributed control node (DCN) comprising:
first and second communication interfaces;
a passive data store that is readable wirelessly by a sensor of a portable setup device (PSD), wherein the passive data store is configured to convey static information about establishing an out-of-band communication channel with the first communication interface of the DCN, wherein the out-of-band communication channel is outside of a process automation network through which the DCN is to be communicatively coupled with other process automation nodes of a process automation system via the second communication interface; and
circuitry configured to:
join the out-of-band communication channel between the first communication interface and the PSD;
receive, over the out-of-band communication channel, operational technology (OT) and information technology (IT) configuration data relayed by the PSD from a remote computing system;
based on IT configuration data, communicatively couple the second communication interface with the process automation network; and
based on the OT configuration data, exchange data with one or more of the other process automation nodes on the process automation network to implement an at least partially automated process.

19. The DCN of claim 18, wherein the first communication interface comprises a wireless personal area network (PAN) interface and the second communication interface comprises an Ethernet interface.

* * * * *